US008026777B2

(12) United States Patent  
Anthony (10) Patent No.: US 8,026,777 B2  
(45) Date of Patent: Sep. 27, 2011

(54) ENERGY CONDITIONER STRUCTURES

(75) Inventor: David J. Anthony, Erie, PA (US)

(73) Assignee: X2Y Attenuators, LLC, Erie, PA (US)

( * ) Notice: Subject to any disclaimer, the term of this patent is extended or adjusted under 35 U.S.C. 154(b) by 187 days.

(21) Appl. No.: 12/281,726

(22) PCT Filed: Mar. 7, 2007

(86) PCT No.: PCT/US2007/063463  
§ 371 (c)(1),  
(2), (4) Date: Sep. 4, 2008

(87) PCT Pub. No.: WO2007/103965  
PCT Pub. Date: Sep. 13, 2007

(65) Prior Publication Data  
US 2009/0040686 A1 Feb. 12, 2009

Related U.S. Application Data

(60) Provisional application No. 60/779,455, filed on Mar. 7, 2006.

(51) Int. Cl.  
*H03H 7/00* (2006.01)  
*H01G 2/14* (2006.01)

(52) U.S. Cl. ........ 333/181; 361/15; 361/306.3; 333/185

(58) Field of Classification Search ............ 361/15, 361/306.3; 333/181, 184, 185  
See application file for complete search history.

(56) References Cited

U.S. PATENT DOCUMENTS  
3,240,621 A 3/1966 Flower, Jr. et al.  
(Continued)

FOREIGN PATENT DOCUMENTS  
DE 197 28 692 A1 1/1999  
(Continued)

OTHER PUBLICATIONS

Oct. 1, 2002, PCT International Search Report for PCT/US01/48861.*

(Continued)

*Primary Examiner* — Robert Pascal  
*Assistant Examiner* — Kimberly E Glenn  
(74) *Attorney, Agent, or Firm* — Kenneth C. Spafford (57) ABSTRACT

Disclosed are energy conditioner structures, method of making and using them wherein the structure comprises a sequence of conductive layers including a first A layer, a G layer, and a first B layer; wherein said first A layer, said G layer, and said first B layer are each conductive, and are conductively isolated from one another in said energy conditioner structure; wherein said first A layer includes a first A layer main body and a first A layer tab, said first B layer includes a first B layer main body and a first B layer tab, and said G layer includes a G layer main body and a G layer first tab; wherein said G layer is in a plane between a plane containing said first A layer and a plane containing said first B layer; where the main body of at least one of said first A layer and said first B layer opposes a portion of said G layer main body; wherein two of said first A layer tab, said first B layer tab, and said G layer first tab are on a first side of said energy conditioner, and the remaining one of said first A layer tab, said first B layer tab, and said G layer first tab is on a second side of said energy conditioner, and said second side is opposite from said first side; and said method comprising applying electrical energy to one of said first A layer, said G layer, and said first B layer.

31 Claims, 6 Drawing Sheets

U.S. PATENT DOCUMENTS

| | | | |
|---|---|---|---|
| 3,343,034 A | 9/1967 | Ovshinsky | |
| 3,379,943 A | 4/1968 | Breedlove | |
| 3,573,677 A | 4/1971 | Detar | |
| 3,736,471 A | 5/1973 | Donze et al. | |
| 3,742,420 A | 6/1973 | Harnden, Jr. | |
| 3,790,858 A | 2/1974 | Brancaleone et al. | |
| 3,842,374 A | 10/1974 | Schlicke | |
| 4,023,071 A | 5/1977 | Fussell | |
| 4,119,084 A | 10/1978 | Eckels | |
| 4,135,132 A | 1/1979 | Tafjord | |
| 4,139,783 A | 2/1979 | Engeler | |
| 4,191,986 A | 3/1980 | ta Huang et al. | |
| 4,198,613 A | 4/1980 | Whitley | |
| 4,259,604 A | 3/1981 | Aoki | |
| 4,262,317 A | 4/1981 | Baumbach | |
| 4,275,945 A | 6/1981 | Krantz et al. | |
| 4,292,558 A | 9/1981 | Flick et al. | |
| 4,308,509 A | 12/1981 | Tsuchiya et al. | |
| 4,320,364 A | 3/1982 | Sakamoto et al. | |
| 4,335,417 A | 6/1982 | Sakshaug et al. | |
| 4,353,044 A | 10/1982 | Nossek | |
| 4,366,456 A | 12/1982 | Ueno et al. | |
| 4,384,263 A | 5/1983 | Neuman et al. | |
| 4,394,639 A | 7/1983 | McGalliard | |
| 4,412,146 A | 10/1983 | Futterer et al. | |
| 4,494,092 A | 1/1985 | Griffin et al. | |
| 4,533,931 A | 8/1985 | Mandai et al. | |
| 4,553,114 A | 11/1985 | English et al. | |
| 4,563,659 A | 1/1986 | Sakamoto | |
| 4,586,104 A | 4/1986 | Standler | |
| 4,587,589 A | 5/1986 | Marek | |
| 4,590,537 A | 5/1986 | Sakamoto | |
| 4,592,606 A | 6/1986 | Mudra | |
| 4,612,140 A | 9/1986 | Mandai | |
| 4,612,497 A | 9/1986 | Ulmer | |
| 4,636,752 A | 1/1987 | Saito | |
| 4,682,129 A | 7/1987 | Bakermans et al. | |
| 4,685,025 A | 8/1987 | Carlomagno | |
| 4,688,151 A | 8/1987 | Kraus et al. | |
| 4,694,265 A | 9/1987 | Kupper | |
| 4,698,721 A | 10/1987 | Warren | |
| 4,703,386 A | 10/1987 | Speet et al. | |
| 4,712,062 A | 12/1987 | Takamine | |
| 4,713,540 A | 12/1987 | Gilby et al. | |
| 4,720,760 A | 1/1988 | Starr | |
| 4,746,557 A | 5/1988 | Sakamoto et al. | |
| 4,752,752 A | 6/1988 | Okubo | |
| 4,760,485 A | 7/1988 | Ari et al. | |
| 4,772,225 A | 9/1988 | Ulery | |
| 4,777,460 A | 10/1988 | Okubo | |
| 4,780,598 A | 10/1988 | Fahey et al. | |
| 4,782,311 A | 11/1988 | Ookubo | |
| 4,789,847 A | 12/1988 | Sakamoto et al. | |
| 4,793,058 A | 12/1988 | Venaleck | |
| 4,794,485 A | 12/1988 | Bennett | |
| 4,794,499 A | 12/1988 | Ott | |
| 4,795,658 A | 1/1989 | Kano et al. | |
| 4,799,070 A | 1/1989 | Nishikawa | |
| 4,801,904 A | 1/1989 | Sakamoto et al. | |
| 4,814,295 A | 3/1989 | Mehta | |
| 4,814,938 A | 3/1989 | Arakawa et al. | |
| 4,814,941 A | 3/1989 | Speet et al. | |
| 4,819,126 A | 4/1989 | Kornrumpf et al. | |
| 4,845,606 A | 7/1989 | Herbert | |
| 4,847,730 A | 7/1989 | Konno et al. | |
| 4,904,967 A | 2/1990 | Morii et al. | |
| 4,908,586 A | 3/1990 | Kling et al. | |
| 4,908,590 A | 3/1990 | Sakamoto et al. | |
| 4,924,340 A | 5/1990 | Sweet | |
| 4,942,353 A | 7/1990 | Herbert et al. | |
| 4,967,315 A | 10/1990 | Schelhorn | |
| 4,978,906 A | 12/1990 | Herbert et al. | |
| 4,990,202 A | 2/1991 | Murata et al. | |
| 4,999,595 A | 3/1991 | Azumi et al. | |
| 5,029,062 A | 7/1991 | Capel | |
| 5,034,709 A | 7/1991 | Azumi et al. | |
| 5,034,710 A | 7/1991 | Kawaguchi | |
| 5,051,712 A | 9/1991 | Naito et al. | |
| 5,059,140 A | 10/1991 | Philippson et al. | |
| 5,065,284 A | 11/1991 | Hernandez | |
| 5,073,523 A | 12/1991 | Yamada et al. | |
| 5,079,069 A | 1/1992 | Howard et al. | |
| 5,079,223 A | 1/1992 | Maroni | |
| 5,079,669 A | 1/1992 | Williams | |
| 5,089,688 A | 2/1992 | Fang et al. | |
| 5,105,333 A | 4/1992 | Yamano et al. | |
| 5,107,394 A | 4/1992 | Naito et al. | |
| 5,109,206 A | 4/1992 | Carlile | |
| 5,140,297 A | 8/1992 | Jacobs et al. | |
| 5,140,497 A | 8/1992 | Kato et al. | |
| 5,142,430 A | 8/1992 | Anthony | |
| 5,148,005 A | 9/1992 | Fang et al. | |
| 5,155,655 A | 10/1992 | Howard et al. | |
| 5,161,086 A | 11/1992 | Howard et al. | |
| 5,162,977 A | 11/1992 | Paurus et al. | |
| 5,167,483 A | 12/1992 | Gardiner | |
| 5,173,670 A | 12/1992 | Naito et al. | |
| 5,179,362 A | 1/1993 | Okochi et al. | |
| 5,181,859 A | 1/1993 | Foreman et al. | |
| 5,186,647 A | 2/1993 | Denkmann et al. | |
| 5,206,786 A | 4/1993 | Lee | |
| 5,208,502 A | 5/1993 | Yamashita et al. | |
| 5,219,812 A | 6/1993 | Doi et al. | |
| 5,220,480 A | 6/1993 | Kershaw, Jr. et al. | |
| 5,236,376 A | 8/1993 | Cohen | |
| 5,243,308 A | 9/1993 | Shusterman et al. | |
| 5,251,092 A | 10/1993 | Brady et al. | |
| 5,257,950 A | 11/1993 | Lenker et al. | |
| 5,261,153 A | 11/1993 | Lucas | |
| 5,262,611 A | 11/1993 | Danysh et al. | |
| 5,268,810 A | 12/1993 | DiMarco et al. | |
| 5,290,191 A | 3/1994 | Foreman et al. | |
| 5,299,956 A | 4/1994 | Brownell et al. | |
| 5,300,760 A | 4/1994 | Batliwalla et al. | |
| 5,310,363 A | 5/1994 | Brownell et al. | |
| 5,311,408 A | 5/1994 | Ferchau et al. | |
| 5,319,525 A | 6/1994 | Lightfoot | |
| 5,321,373 A | 6/1994 | Shusterman et al. | |
| 5,321,573 A | 6/1994 | Person et al. | |
| 5,326,284 A | 7/1994 | Bohbot et al. | |
| 5,337,028 A | 8/1994 | White | |
| 5,353,189 A | 10/1994 | Tomlinson | |
| 5,353,202 A | 10/1994 | Ansell et al. | |
| 5,357,568 A | 10/1994 | Pelegris | |
| 5,362,249 A | 11/1994 | Carter | |
| 5,362,254 A | 11/1994 | Siemon et al. | |
| 5,378,407 A | 1/1995 | Chandler et al. | |
| 5,382,928 A | 1/1995 | Davis et al. | |
| 5,382,938 A | 1/1995 | Hansson et al. | |
| 5,386,335 A | 1/1995 | Amano et al. | |
| 5,396,201 A | 3/1995 | Ishizaki et al. | |
| 5,401,952 A | 3/1995 | Sugawa | |
| 5,405,466 A | 4/1995 | Naito et al. | |
| 5,414,393 A | 5/1995 | Rose et al. | |
| 5,414,587 A | 5/1995 | Kiser et al. | |
| 5,420,553 A | 5/1995 | Sakamoto et al. | |
| 5,432,484 A | 7/1995 | Klas et al. | |
| 5,446,625 A | 8/1995 | Urbish et al. | |
| 5,450,278 A | 9/1995 | Lee et al. | |
| 5,451,919 A | 9/1995 | Chu et al. | |
| RE35,064 E | 10/1995 | Hernandez | |
| 5,455,734 A | 10/1995 | Foreman et al. | |
| 5,461,351 A | 10/1995 | Shusterman | |
| 5,463,232 A | 10/1995 | Yamashita et al. | |
| 5,471,035 A | 11/1995 | Holmes | |
| 5,477,933 A | 12/1995 | Nguyen | |
| 5,481,238 A | 1/1996 | Carsten et al. | |
| 5,483,407 A | 1/1996 | Anastasio et al. | |
| 5,483,413 A | 1/1996 | Babb | |
| 5,488,540 A | 1/1996 | Hatta | |
| 5,491,299 A | 2/1996 | Naylor et al. | |
| 5,493,260 A | 2/1996 | Park | |
| 5,495,180 A | 2/1996 | Huang et al. | |
| 5,500,629 A | 3/1996 | Meyer | |
| 5,500,785 A | 3/1996 | Funada | |
| 5,512,196 A | 4/1996 | Mantese et al. | |
| 5,531,003 A | 7/1996 | Seifried et al. | |

| | | | | | | |
|---|---|---|---|---|---|---|
| 5,534,837 | A | 7/1996 | Brandt | 6,016,095 A | 1/2000 | Herbert |
| 5,535,101 | A | 7/1996 | Miles et al. | 6,018,448 A | 1/2000 | Anthony |
| 5,536,978 | A | 7/1996 | Cooper et al. | 6,021,564 A | 2/2000 | Hanson |
| 5,541,482 | A | 7/1996 | Siao | 6,023,406 A | 2/2000 | Kinoshita et al. |
| 5,544,002 | A | 8/1996 | Iwaya et al. | 6,031,710 A | 2/2000 | Wolf et al. |
| 5,546,058 | A | 8/1996 | Azuma et al. | 6,034,576 A | 3/2000 | Kuth |
| 5,548,255 | A | 8/1996 | Spielman | 6,034,864 A | 3/2000 | Naito et al. |
| 5,555,150 | A | 9/1996 | Newman, Jr. | 6,037,846 A | 3/2000 | Oberhammer |
| 5,568,348 | A | 10/1996 | Foreman et al. | 6,038,121 A | 3/2000 | Naito et al. |
| 5,570,278 | A | 10/1996 | Cross | 6,042,685 A | 3/2000 | Shinada et al. |
| 5,583,359 | A | 12/1996 | Ng et al. | 6,046,898 A | 4/2000 | Seymour et al. |
| 5,586,007 | A | 12/1996 | Funada | 6,052,038 A | 4/2000 | Savicki |
| 5,590,016 | A | 12/1996 | Fujishiro | 6,061,227 A | 5/2000 | Nogi |
| 5,592,391 | A | 1/1997 | Muyshondt et al. | 6,064,286 A | 5/2000 | Ziegner et al. |
| 5,612,657 | A | 3/1997 | Kledzik | 6,072,687 A | 6/2000 | Naito et al. |
| 5,614,881 | A | 3/1997 | Duggal et al. | 6,075,211 A | 6/2000 | Tohya et al. |
| 5,619,079 | A | 4/1997 | Wiggins et al. | 6,078,117 A | 6/2000 | Perrin et al. |
| 5,624,592 | A | 4/1997 | Paustian | 6,078,229 A | 6/2000 | Funada et al. |
| 5,640,048 | A | 6/1997 | Selna | 6,084,779 A | 7/2000 | Fang |
| 5,645,746 | A | 7/1997 | Walsh | 6,088,235 A | 7/2000 | Chiao et al. |
| 5,647,766 | A | 7/1997 | Nguyen | 6,091,310 A | 7/2000 | Utsumi et al. |
| 5,647,767 | A | 7/1997 | Scheer et al. | 6,092,269 A | 7/2000 | Yializis et al. |
| 5,668,511 | A | 9/1997 | Furutani et al. | 6,094,112 A | 7/2000 | Goldberger et al. |
| 5,682,303 | A | 10/1997 | Goad | 6,094,339 A | 7/2000 | Evans |
| 5,692,298 | A | 12/1997 | Goetz et al. | 6,097,260 A | 8/2000 | Whybrew et al. |
| 5,700,167 | A | 12/1997 | Pharney et al. | 6,097,581 A | 8/2000 | Anthony |
| 5,708,553 | A | 1/1998 | Hung | 6,104,258 A | 8/2000 | Novak |
| 5,719,450 | A | 2/1998 | Vora | 6,104,599 A | 8/2000 | Ahiko et al. |
| 5,719,477 | A | 2/1998 | Tomihari | 6,108,448 A | 8/2000 | Song et al. |
| 5,719,750 | A | 2/1998 | Iwane | 6,111,479 A | 8/2000 | Myohga et al. |
| 5,741,729 | A | 4/1998 | Selna | 6,120,326 A | 9/2000 | Brooks |
| 5,751,539 | A | 5/1998 | Stevenson et al. | 6,121,761 A | 9/2000 | Herbert |
| 5,767,446 | A | 6/1998 | Ha et al. | 6,125,044 A | 9/2000 | Cherniski et al. |
| 5,789,999 | A | 8/1998 | Barnett et al. | 6,130,585 A | 10/2000 | Whybrew et al. |
| 5,790,368 | A | 8/1998 | Naito et al. | 6,137,392 A | 10/2000 | Herbert |
| 5,796,568 | A | 8/1998 | Baiatu | 6,142,831 A | 11/2000 | Ashman et al. |
| 5,796,595 | A | 8/1998 | Cross | 6,144,547 A | 11/2000 | Retseptor |
| 5,797,770 | A | 8/1998 | Davis et al. | 6,147,587 A | 11/2000 | Hadano et al. |
| 5,808,873 | A | 9/1998 | Celaya et al. | 6,150,895 A | 11/2000 | Steigerwald et al. |
| 5,822,174 | A | 10/1998 | Yamate et al. | 6,157,528 A | 12/2000 | Anthony |
| 5,825,084 | A | 10/1998 | Lau et al. | 6,157,547 A | 12/2000 | Brown et al. |
| 5,825,628 | A | 10/1998 | Garbelli et al. | 6,160,705 A | 12/2000 | Stearns et al. |
| 5,828,093 | A | 10/1998 | Naito et al. | 6,163,454 A | 12/2000 | Strickler |
| 5,828,272 | A | 10/1998 | Romerein et al. | 6,163,456 A | 12/2000 | Suzuki et al. |
| 5,828,555 | A | 10/1998 | Itoh | 6,165,814 A | 12/2000 | Wark et al. |
| 5,831,489 | A | 11/1998 | Wire | 6,175,287 B1 | 1/2001 | Lampen et al. |
| 5,834,992 | A | 11/1998 | Kato et al. | 6,180,588 B1 | 1/2001 | Walters |
| 5,838,216 | A | 11/1998 | White et al. | 6,181,004 B1 | 1/2001 | Koontz et al. |
| 5,847,936 | A | 12/1998 | Forehand et al. | 6,181,231 B1 | 1/2001 | Bartilson |
| 5,867,361 | A | 2/1999 | Wolf et al. | 6,183,685 B1 | 2/2001 | Cowman et al. |
| 5,870,272 | A | 2/1999 | Seifried et al. | 6,185,091 B1 | 2/2001 | Tanahashi et al. |
| 5,875,099 | A | 2/1999 | Maesaka et al. | 6,188,565 B1 | 2/2001 | Naito et al. |
| 5,880,925 | A | 3/1999 | DuPre et al. | 6,191,472 B1 | 2/2001 | Mazumder |
| 5,889,445 | A | 3/1999 | Ritter et al. | 6,191,475 B1 | 2/2001 | Skinner et al. |
| 5,895,990 | A | 4/1999 | Lau | 6,191,669 B1 | 2/2001 | Shigemura |
| 5,898,403 | A | 4/1999 | Saitoh et al. | 6,191,932 B1 | 2/2001 | Kuroda et al. |
| 5,898,562 | A | 4/1999 | Cain et al. | 6,195,269 B1 | 2/2001 | Hino |
| 5,905,627 | A | 5/1999 | Brendel et al. | 6,198,123 B1 | 3/2001 | Linder et al. |
| 5,907,265 | A | 5/1999 | Sakuragawa et al. | 6,198,362 B1 | 3/2001 | Harada et al. |
| 5,908,151 | A | 6/1999 | Elias | 6,204,448 B1 | 3/2001 | Garland et al. |
| 5,909,155 | A | 6/1999 | Anderson et al. | 6,205,014 B1 | 3/2001 | Inomata et al. |
| 5,909,350 | A | 6/1999 | Anthony | 6,207,081 B1 | 3/2001 | Sasaki et al. |
| 5,910,755 | A | 6/1999 | Mishiro et al. | 6,208,063 B1 | 3/2001 | Horikawa |
| 5,912,809 | A | 6/1999 | Steigerwald et al. | 6,208,225 B1 | 3/2001 | Miller |
| 5,917,388 | A | 6/1999 | Tronche et al. | 6,208,226 B1 | 3/2001 | Chen et al. |
| 5,926,377 | A | 7/1999 | Nakao et al. | 6,208,494 B1 | 3/2001 | Nakura et al. |
| 5,928,076 | A | 7/1999 | Clements et al. | 6,208,495 B1 | 3/2001 | Wieloch et al. |
| 5,955,930 | A | 9/1999 | Anderson et al. | 6,208,501 B1 | 3/2001 | Ingalls et al. |
| 5,959,829 | A | 9/1999 | Stevenson et al. | 6,208,502 B1 | 3/2001 | Hudis et al. |
| 5,959,846 | A | 9/1999 | Noguchi et al. | 6,208,503 B1 | 3/2001 | Shimada et al. |
| 5,969,461 | A | 10/1999 | Anderson et al. | 6,208,521 B1 | 3/2001 | Nakatsuka |
| 5,977,845 | A | 11/1999 | Kitahara | 6,208,525 B1 | 3/2001 | Imasu et al. |
| 5,978,231 | A | 11/1999 | Tohya et al. | 6,211,754 B1 | 4/2001 | Nishida et al. |
| 5,980,718 | A | 11/1999 | Van Konynenburg et al. | 6,212,078 B1 | 4/2001 | Hunt et al. |
| 5,995,352 | A | 11/1999 | Gumley | 6,215,373 B1 | 4/2001 | Novak et al. |
| 5,999,067 | A | 12/1999 | D'Ostilio | 6,215,647 B1 | 4/2001 | Naito et al. |
| 5,999,398 | A | 12/1999 | Makl et al. | 6,215,649 B1 | 4/2001 | Appelt et al. |
| 6,004,752 | A | 12/1999 | Loewy et al. | 6,218,631 B1 | 4/2001 | Hetzel et al. |
| 6,013,957 | A | 1/2000 | Puzo et al. | 6,219,240 B1 | 4/2001 | Sasov |

| Patent Number | Date | Inventor |
|---|---|---|
| 6,222,427 B1 | 4/2001 | Kato et al. |
| 6,222,431 B1 | 4/2001 | Ishizaki et al. |
| 6,225,876 B1 | 5/2001 | Akino et al. |
| 6,226,169 B1 | 5/2001 | Naito et al. |
| 6,226,182 B1 | 5/2001 | Maehara |
| 6,229,226 B1 | 5/2001 | Kramer et al. |
| 6,236,572 B1 | 5/2001 | Teshome et al. |
| 6,240,621 B1 | 6/2001 | Nellissen et al. |
| 6,243,253 B1 | 6/2001 | DuPre et al. |
| 6,249,047 B1 | 6/2001 | Corisis |
| 6,249,439 B1 | 6/2001 | DeMore et al. |
| 6,252,161 B1 | 6/2001 | Hailey et al. |
| 6,262,895 B1 | 7/2001 | Forthun |
| 6,266,228 B1 | 7/2001 | Naito et al. |
| 6,266,229 B1 | 7/2001 | Naito et al. |
| 6,272,003 B1 | 8/2001 | Schaper |
| 6,281,704 B2 | 8/2001 | Ngai et al. |
| 6,282,074 B1 | 8/2001 | Anthony |
| 6,282,079 B1 | 8/2001 | Nagakari et al. |
| 6,285,109 B1 | 9/2001 | Katagiri et al. |
| 6,285,542 B1 | 9/2001 | Kennedy, III et al. |
| 6,288,906 B1 | 9/2001 | Sprietsma et al. |
| 6,292,350 B1 | 9/2001 | Naito et al. |
| 6,292,351 B1 | 9/2001 | Ahiko et al. |
| 6,309,245 B1 | 10/2001 | Sweeney |
| 6,310,286 B1 | 10/2001 | Troxel et al. |
| 6,313,584 B1 | 11/2001 | Johnson et al. |
| 6,320,547 B1 | 11/2001 | Fathy et al. |
| 6,324,047 B1 | 11/2001 | Hayworth |
| 6,324,048 B1 | 11/2001 | Liu |
| 6,325,672 B1 | 12/2001 | Belopolsky et al. |
| 6,327,134 B1 | 12/2001 | Kuroda et al. |
| 6,327,137 B1 | 12/2001 | Yamomoto et al. |
| 6,331,926 B1 | 12/2001 | Anthony |
| 6,331,930 B1 | 12/2001 | Kuroda |
| 6,342,681 B1 | 1/2002 | Goldberger et al. |
| 6,346,743 B1 | 2/2002 | Figueroa et al. |
| 6,352,914 B2 | 3/2002 | Ball et al. |
| 6,353,540 B1 | 3/2002 | Akiba et al. |
| 6,373,673 B1 | 4/2002 | Anthony |
| 6,388,207 B1 | 5/2002 | Figueroa et al. |
| 6,388,856 B1 | 5/2002 | Anthony |
| 6,395,996 B1 | 5/2002 | Tsai et al. |
| 6,448,873 B1 | 9/2002 | Mostov |
| 6,456,481 B1 | 9/2002 | Stevenson |
| 6,469,595 B2 | 10/2002 | Anthony et al. |
| 6,498,710 B1 | 12/2002 | Anthony |
| 6,504,451 B1 | 1/2003 | Yamaguchi |
| 6,509,640 B1 | 1/2003 | Li et al. |
| 6,509,807 B1 | 1/2003 | Anthony et al. |
| 6,510,038 B1 | 1/2003 | Satou et al. |
| 6,522,516 B2 | 2/2003 | Anthony |
| 6,549,389 B2 | 4/2003 | Anthony et al. |
| 6,559,484 B1 | 5/2003 | Li et al. |
| 6,563,688 B2 | 5/2003 | Anthony et al. |
| 6,580,595 B2 | 6/2003 | Anthony et al. |
| 6,594,128 B2 | 7/2003 | Anthony |
| 6,603,372 B1 | 8/2003 | Ishizaki et al. |
| 6,603,646 B2 | 8/2003 | Anthony et al. |
| 6,606,011 B2 | 8/2003 | Anthony et al. |
| 6,606,237 B1 | 8/2003 | Naito et al. |
| 6,608,538 B2 | 8/2003 | Wang |
| 6,618,268 B2 | 9/2003 | Dibene, II et al. |
| 6,636,406 B1 | 10/2003 | Anthony |
| 6,650,525 B2 | 11/2003 | Anthony |
| 6,687,108 B1 | 2/2004 | Anthony et al. |
| 6,696,952 B2 | 2/2004 | Zirbes |
| 6,717,301 B2 | 4/2004 | De Daran et al. |
| 6,738,249 B1 | 5/2004 | Anthony et al. |
| 6,806,806 B2 | 10/2004 | Anthony |
| 6,873,513 B2 | 3/2005 | Anthony |
| 6,894,884 B2 | 5/2005 | Anthony, Jr. et al. |
| 6,950,293 B2 | 9/2005 | Anthony |
| 6,954,346 B2 | 10/2005 | Anthony |
| 6,995,983 B1 | 2/2006 | Anthony et al. |
| 7,042,303 B2 | 5/2006 | Anthony et al. |
| 7,042,703 B2 | 5/2006 | Anthony et al. |
| 7,050,284 B2 | 5/2006 | Anthony |
| 7,106,570 B2 | 9/2006 | Anthony, Jr. et al. |
| 7,110,227 B2 | 9/2006 | Anthony et al. |
| 7,110,235 B2 | 9/2006 | Anthony, Jr. et al. |
| 7,113,383 B2 | 9/2006 | Anthony et al. |
| 7,141,899 B2 | 11/2006 | Anthony et al. |
| 7,180,718 B2 | 2/2007 | Anthony et al. |
| 7,193,831 B2 | 3/2007 | Anthony |
| 7,224,564 B2 | 5/2007 | Anthony |
| 7,262,949 B2 | 8/2007 | Anthony |
| 7,274,549 B2 | 9/2007 | Anthony |
| 7,301,748 B2 | 11/2007 | Anthony et al. |
| 7,321,485 B2 | 1/2008 | Anthony et al. |
| 7,336,467 B2 | 2/2008 | Anthony et al. |
| 7,336,468 B2 | 2/2008 | Anthony et al. |
| 7,423,860 B2 | 9/2008 | Anthony et al. |
| 7,428,134 B2 | 9/2008 | Anthony |
| 7,440,252 B2 | 10/2008 | Anthony |
| 7,443,647 B2 | 10/2008 | Anthony |
| 2001/0001989 A1* | 5/2001 | Smith |
| 2001/0002105 A1* | 5/2001 | Brandelik et al. |
| 2001/0002624 A1* | 6/2001 | Khandros et al. |
| 2001/0008288 A1* | 7/2001 | Kimura et al. |
| 2001/0008302 A1* | 7/2001 | Murakami et al. |
| 2001/0008478 A1* | 7/2001 | McIntosh et al. |
| 2001/0008509 A1* | 7/2001 | Watanabe |
| 2001/0009496 A1* | 7/2001 | Kappel et al. |
| 2001/0010444 A1* | 8/2001 | Pahl et al. |
| 2001/0011763 A1 | 8/2001 | Ushijima et al. |
| 2001/0011934 A1 | 8/2001 | Yamamoto |
| 2001/0011937 A1 | 8/2001 | Satoh et al. |
| 2001/0013626 A1 | 8/2001 | Fujii |
| 2001/0015643 A1 | 8/2001 | Goldfine et al. |
| 2001/0015683 A1 | 8/2001 | Mikami et al. |
| 2001/0017576 A1 | 8/2001 | Kondo et al. |
| 2001/0017579 A1 | 8/2001 | Kurata |
| 2001/0019869 A1 | 9/2001 | Hsu |
| 2001/0020879 A1 | 9/2001 | Takahashi et al. |
| 2001/0021097 A1 | 9/2001 | Ohya et al. |
| 2001/0022547 A1 | 9/2001 | Murata et al. |
| 2001/0023983 A1 | 9/2001 | Kobayashi et al. |
| 2001/0024148 A1 | 9/2001 | Gerstenberg et al. |
| 2001/0028581 A1 | 10/2001 | Yanagisawa et al. |
| 2001/0029648 A1 | 10/2001 | Ikada et al. |
| 2001/0031191 A1 | 10/2001 | Korenaga |
| 2001/0033664 A1 | 10/2001 | Poux et al. |
| 2001/0035801 A1 | 11/2001 | Gilbert |
| 2001/0035802 A1 | 11/2001 | Kadota |
| 2001/0035805 A1 | 11/2001 | Suzuki et al. |
| 2001/0037680 A1 | 11/2001 | Buck et al. |
| 2001/0039834 A1 | 11/2001 | Hsu |
| 2001/0040484 A1 | 11/2001 | Kim |
| 2001/0040487 A1 | 11/2001 | Ikata et al. |
| 2001/0040488 A1 | 11/2001 | Gould et al. |
| 2001/0041305 A1 | 11/2001 | Sawada et al. |
| 2001/0043100 A1 | 11/2001 | Tomita et al. |
| 2001/0043129 A1 | 11/2001 | Hidaka et al. |
| 2001/0043450 A1 | 11/2001 | Seale et al. |
| 2001/0043453 A1 | 11/2001 | Narwankar et al. |
| 2001/0045810 A1 | 11/2001 | Poon et al. |
| 2001/0048581 A1 | 12/2001 | Anthony et al. |
| 2001/0048593 A1 | 12/2001 | Yamauchi et al. |
| 2001/0048906 A1 | 12/2001 | Lau et al. |
| 2001/0050550 A1 | 12/2001 | Yoshida et al. |
| 2001/0050600 A1 | 12/2001 | Anthony et al. |
| 2001/0050837 A1 | 12/2001 | Stevenson et al. |
| 2001/0052833 A1 | 12/2001 | Enokihara et al. |
| 2001/0054512 A1 | 12/2001 | Belau et al. |
| 2001/0054734 A1 | 12/2001 | Koh et al. |
| 2001/0054756 A1 | 12/2001 | Horiuchi et al. |
| 2001/0054936 A1 | 12/2001 | Okada et al. |
| 2002/0000521 A1 | 1/2002 | Brown |
| 2002/0000583 A1 | 1/2002 | Kitsukawa et al. |
| 2002/0000821 A1 | 1/2002 | Haga et al. |
| 2002/0000893 A1 | 1/2002 | Hidaka et al. |
| 2002/0000895 A1 | 1/2002 | Takahashi et al. |
| 2002/0003454 A1 | 1/2002 | Sweeney et al. |
| 2002/0005880 A1 | 1/2002 | Ashe et al. |
| 2002/0024787 A1 | 2/2002 | Anthony |
| 2002/0027263 A1 | 3/2002 | Anthony et al. |
| 2002/0027760 A1 | 3/2002 | Anthony |

| | | | | | | |
|---|---|---|---|---|---|---|
| 2002/0044401 | A1 | 4/2002 | Anthony et al. | JP | 06-151014 | 5/1994 |
| 2002/0075096 | A1 | 6/2002 | Anthony | JP | 06-151244 | 5/1994 |
| 2002/0079116 | A1 | 6/2002 | Anthony | JP | 06-151245 | 5/1994 |
| 2002/0089812 | A1 | 7/2002 | Anthony et al. | JP | 6-302471 | * 10/1994 |
| 2002/0113663 | A1 | 8/2002 | Anthony et al. | JP | 06-325977 | 11/1994 |
| 2002/0122286 | A1 | 9/2002 | Anthony | JP | 07-022757 | * 1/1995 |
| 2002/0131231 | A1 | 9/2002 | Anthony | JP | 07 161568 | * 6/1995 |
| 2002/0149900 | A1 | 10/2002 | Anthony | JP | 07-235406 | 9/1995 |
| 2002/0158515 | A1 | 10/2002 | Anthony, Jr. et al. | JP | 07-235852 | 9/1995 |
| 2002/0186100 | A1 | 12/2002 | Anthony et al. | JP | 07-240651 | 9/1995 |
| 2003/0029632 | A1 | 2/2003 | Anthony, Jr. et al. | JP | 08-124795 | 5/1996 |
| 2003/0029635 | A1 | 2/2003 | Anthony, Jr. et al. | JP | 08-163122 | 6/1996 |
| 2003/0048029 | A1 | 3/2003 | DeDaran et al. | JP | 08-172025 | 7/1996 |
| 2003/0067730 | A1 | 4/2003 | Anthony et al. | JP | 9-266130 | * 10/1997 |
| 2003/0161086 | A1 | 8/2003 | Anthony | JP | 09-284077 | 10/1997 |
| 2003/0202312 | A1 | 10/2003 | Anthony et al. | JP | 09-284078 | 10/1997 |
| 2003/0206388 | A9 | 11/2003 | Anthony et al. | JP | 9-294041 | 11/1997 |
| 2003/0210125 | A1 | 11/2003 | Anthony | JP | 10-12490 | * 1/1998 |
| 2003/0231451 | A1 | 12/2003 | Anthony | JP | 11-97291 | * 4/1999 |
| 2003/0231456 | A1 | 12/2003 | Anthony et al. | JP | 11-21456 | 8/1999 |
| 2004/0004802 | A1 | 1/2004 | Anthony et al. | JP | 11-214256 | 8/1999 |
| 2004/0008466 | A1 | 1/2004 | Anthony et al. | JP | 11-223396 | 8/1999 |
| 2004/0027771 | A1 | 2/2004 | Anthony | JP | 11-219824 | * 10/1999 |
| 2004/0032304 | A1 | 2/2004 | Anthony et al. | JP | 11-294908 | 10/1999 |
| 2004/0054426 | A1 | 3/2004 | Anthony | JP | 11-305302 | 11/1999 |
| 2004/0085699 | A1 | 5/2004 | Anthony | JP | 11-319222 | 11/1999 |
| 2004/0105205 | A1 | 6/2004 | Anthony et al. | JP | 11-345273 | 12/1999 |
| 2004/0124949 | A1 | 7/2004 | Anthony et al. | JP | 2000-188218 | * 4/2000 |
| 2004/0130840 | A1 | 7/2004 | Anthony | JP | 2000-243646 | * 8/2000 |
| 2004/0218332 | A1 | 11/2004 | Anthony et al. | JP | 2000-286665 | * 10/2000 |
| 2004/0226733 | A1 | 11/2004 | Anthony et al. | WO | WO 91/15046 | 10/1991 |
| 2005/0016761 | A9 | 1/2005 | Anthony, Jr. et al. | WO | WO 97/20332 | * 6/1997 |
| 2005/0018374 | A1 | 1/2005 | Anthony | WO | WO 97/43786 | * 11/1997 |
| 2005/0063127 | A1 | 3/2005 | Anthony | WO | WO 98/45921 | 10/1998 |
| 2005/0248900 | A1 | 11/2005 | Anthony | WO | WO 99/04457 | * 1/1999 |
| 2005/0286198 | A1 | 12/2005 | Anthony et al. | WO | WO 99/19982 | 4/1999 |
| 2006/0023385 | A9 | 2/2006 | Anthony et al. | WO | WO 99/37008 | 7/1999 |
| 2006/0139836 | A1 | 6/2006 | Anthony | WO | WO 95/52210 | 10/1999 |
| 2006/0139837 | A1 | 6/2006 | Anthony et al. | WO | WO 00/16446 | 3/2000 |
| 2006/0193051 | A1 | 8/2006 | Anthony et al. | WO | WO 00/65740 | 11/2000 |
| 2006/0203414 | A1 | 9/2006 | Anthony | WO | WO 00/74197 | 12/2000 |
| 2007/0019352 | A1 | 1/2007 | Anthony | WO | WO 00/77907 | 12/2000 |
| 2007/0047177 | A1 | 3/2007 | Anthony | WO | 01/06631 | * 1/2001 |
| 2007/0057359 | A1 | 3/2007 | Anthony et al. | WO | WO 01/10000 | 2/2001 |
| 2007/0103839 | A1 | 5/2007 | Anthony et al. | WO | WO 01/41232 | 6/2001 |
| 2007/0109709 | A1 | 5/2007 | Anthony et al. | WO | WO 01/41233 | 6/2001 |
| 2008/0160681 | A1 | 7/2008 | Anthony et al. | WO | WO 01/45119 | 6/2001 |
| | | | | WO | WO 01/71908 | 9/2001 |
| | | | | WO | WO 01/75916 | 10/2001 |
| | | | | WO | WO 01/84581 | 11/2001 |

FOREIGN PATENT DOCUMENTS

| | | | | | | |
|---|---|---|---|---|---|---|
| DE | 198 57 043 | C1 | 3/2000 | WO | WO 01/86774 | 11/2001 |
| EP | 0623363 | | * 11/1994 | WO | WO 02/59401 | 1/2002 |
| EP | 98915364 | | * 11/1994 | WO | WO 02/11160 | 2/2002 |
| EP | 8172025 | | * 7/1996 | WO | WO 02/15360 | 2/2002 |
| EP | 0776016 | | * 5/1997 | WO | WO02/27794 | 4/2002 |
| EP | 0933871 | | 8/1999 | WO | WO 02/27794 | * 4/2002 |
| EP | 1022751 | | 7/2000 | WO | WO 02/33798 | 4/2002 |
| EP | 1024507 | | 8/2000 | WO | WO 02/45233 | 6/2002 |
| EP | 1061535 | | 12/2000 | WO | WO 02/065606 | 8/2002 |
| EP | 1128434 | | * 8/2001 | WO | WO 02/080330 | 10/2002 |
| EP | 1873872 | | * 12/2008 | WO | WO 03/005541 | 1/2003 |
| FR | 2496970 | | * 6/1982 | WO | WO 2004/070905 | * 8/2004 |
| FR | 2606207 | | * 5/1988 | WO | WO 2005/002018 | * 1/2005 |
| FR | 2765417 | | 12/1998 | WO | WO 2005/015719 | * 2/2005 |
| FR | 2808135 | | 10/2001 | WO | WO 2005/065097 | * 7/2005 |
| GB | 2217136 | | * 4/1988 | WO | WO 2006/093830 | * 9/2006 |
| GB | 2341980 | | * 3/2000 | WO | WO 2006/093831 | * 9/2006 |
| JP | 57-172130 | | * 10/1982 | WO | WO 2006/099297 | * 9/2006 |
| JP | 63-269509 | | 11/1988 | WO | WO 2006/104613 | * 10/2006 |
| JP | 1-27251 | | 1/1989 | WO | WO 2007/103965 | * 9/2007 |
| JP | 02-267879 | | 11/1990 | | | |
| JP | 03-018112 | | 1/1991 | | | |
| JP | 5-283284 | | 10/1993 | | | |
| JP | 05-299292 | | * 11/1993 | | | |
| JP | 06-053048 | | 2/1994 | | | |
| JP | 06-053049 | | 2/1994 | | | |
| JP | 06-053075 | | 2/1994 | | | |
| JP | 06-053077 | | 2/1994 | | | |
| JP | 06-053078 | | 2/1994 | | | |
| JP | 06-084695 | | 3/1994 | | | |

OTHER PUBLICATIONS

Jan. 2, 2003, PCT International Search Report for PCT/US01/44681.*

Jan. 1, 1994, Greb, "An Intuitive Approach to EM Fields," EMC Test & Design, Jan. 1991, pp. 30-33.*

Dec. 1, 1993, Greb, "An Intuitive Approach to EM Coupling," EMC Test & Design, Dec. 1993, pp. 20-25.*

Jun. 1, 1986, Sakamoto, "Noiseproof Power Supplies: What's Important in EMI Removal Filters?" JEE, Jun. 1986, pp. 80-85.*
Jan. 1, 1999, Montrose, "Analysis on Loop Area Trace Radiated Emissions from Decoupling Capacitor Placement on Printed Circuit Boards," IEEE, 1999, pp. 423-428.
Jan. 1, 1999, Miyoshi, "Surface Mounted Distributed Constant Type Noise Filter," IEEE, 1999, pp. 157-160.
Jan. 1, 1999, Shigeta et al., "Improved EMI Performance by Use of a Three-Terminal-Capacitor Applied to an IC Power Line," IEEE, 1999, pp. 161-164.
Jul. 19, 1999, PCT International Search Report for PCT/US99/07653.
Oct. 13, 1999, IPER for PCT/US99/07653.
U.S. Appl. No. 10/479,506, Claims 1-46 from Preliminary Amendment filed Dec. 10, 2003.
U.S. Appl. No. 10/189,339, Claims 1-41 from Preliminary Amendment filed Oct. 28, 2003.
U.S. Appl. No. 10/443,792, Claims 1-41 from Preliminary Amendment filed Oct. 28, 2003.
Aug. 19, 1998, PCT International Search Report for PCT/US98/06962.
Apr. 19, 1999, PCT International Search Report for PCT/US99/01040.
Sep. 18, 2000, PCT International Search Report for PCT/US00/11409.
Sep. 13, 2000, PCT International Search Report for PCT/US00/14626.
Nov. 8, 2000, PCT International Search Report for PCT/US00/16518.
Dec. 28, 2000, PCT International Search Report for PCT/US00/21178.
Fang et al., "Conductive Polymers Prolong Circuit Life," Design News, date unknown, 3 pages.
Sep. 1, 1996, Carpenter, Jr. et al., "A New Approach to TVSS Design," Power Quality Assurance, Sep./Oct. 1996 p. 60-63.
Jan. 1, 1996, Raychem, "Polyswitch Resettable Fuses," Circuit Protection Databook, Jan. 1996, pp. 11-18.
Dec. 28, 2001, PCT International Search Report for PCT/US01/41720.
Jun. 13, 2001, PCT International Search Report for PCT/US01/09185.
Jul. 1, 2000, Polka et al., "Package-Level Interconnect Design for Optimum Electrical Performance," Intel Technology Journal Q3, 2000, pp. 1-17.
May 10, 2002, PCT International Search Report for PCT/US01/43418.
Mar. 13, 2002, PCT International Search Report for PCT/US01/32480.
Aug. 19, 2002, PCT International Search Report for PCT/US02/10302.
Feb. 28, 2003, PCT International Search Report for PCT/US02/21238.
Mar. 18, 2002, PCT International Search Report for PCT/US01/13911.
Jul. 16, 1991, PCT International Search Report for PCT/US91/02150.
Jun. 28, 2001, PCT International Search Report for PCT/US01/03792.
Dec. 16, 1998, "Johanson Dielectrics, Inc. Licenses X2Y Circuit Conditioning Technology," Press Release, Dec. 16, 1998, 1 page.
Mar. 1, 1997, Beyne et al., "PSGA—an innovative IC package for single and multichip designs," Components, Mar. 1997, pp. 6-9.
Sep. 15, 1997, "EMC Design for Brush Commutated DC Electric Motors," Sep. 15, 1997, pp. 1-2.
Apr. 1, 1996, "Tomorrow's Capacitors," Components, 1996, No. 4, p. 3.
Mar. 30, 1998, Mason, "Valor—Understanding Common Mode Noise," Mar. 30, 1998, pp. 1-7.
Anthony Anthony et al., Pending specification, claims, figures for U.S. Appl. No. 10/237,079, Claims 21-81; filed Sep. 9, 2002.
David, Anthony et al., Pending specification, claims, figures for U.S. Appl. No. 10/766,000, Claims 1-63; filed Jan. 29, 2004.
William Anthony, Pending specification, claims, figures for U.S. Appl. No. 10/399,630, Claims 1-35; filed Aug. 27, 2003.
Anthony Anthony et al., Pending specification, claims, figures for U.S. Appl. No. 10/432,840, Claims 1-39; filed May 28, 2003.
William Anthony, Pending specification, claims, figures for U.S. Appl. No. 10/443,482, Claims 1-25; filed Jun. 12, 2003.
Anthony Anthony et al., Pending specification, claims, figures for U.S. Appl. No. 10/435,199, Claims 1-32; filed May 12, 2003.
Anthony Anthony et al., Pending specification, claims, figures for U.S. Appl. No. 10/115,159, Claims 1-31; filed Apr. 2, 2002.
Anthony Anthony et al., Pending specification, claims, figures for U.S. Appl. No. 10/189,338, Claims 1-69; filed Jul. 2, 2002.
Anthony Anthony et al., Pending specification, claims, figures for U.S. Appl. No. 10/189,339, Claims 1-41; filed Jul. 2, 2002.
Anthony Anthony et al., Pending specification, claims, figures for U.S. Appl. No. 10/479,506, Claims 1-46; filed Dec. 10, 2003.
Anthony Anthony, Pending specification, claims, figures for U.S. Appl. No. 10/443,764, Claims 26-40; filed Sep. 16, 2003.
Anthony Anthony, Pending specification, claims, figures for U.S. Appl. No. 10/443,792, Claims 1-41; May 23, 2003.
Anthony Anthony, Pending specification, claims, figures for U.S. Appl. No. 10/443,788, Claims 1; 21-45; filed May 23, 2003.
Anthony Anthony et al., Pending specification, claims, figures for U.S. Appl. No. 10/443,778, Claims 1; 21-59; filed May 23, 2003.
Anthony Anthony et al., Pending specification, claims, figures for U.S. Appl. No. 10/460,361, Claims 1-16; filed Jun. 13, 2003.
Anthony Anthony et al., Pending specification, claims, figures for U.S. Appl. No. 10/705,962, Claims 19-33; filed May 25, 2005.
Anthony Anthony, Pending specification, claims, figures for U.S. Appl. No. 10/369,335, Claims 1-20; Feb. 18, 2003.
Anthony Anthony et al., Pending specification, claims, figures for U.S. Appl. No. 09/647,648, Claims 1-48; filed Nov. 17, 2000.
Anthony Anthony, Pending specification, claims, figures for U.S. Appl. No. 10/328,942, Claims 1-20; filed Dec. 23, 2002.
Anthony Anthony et al., Pending specification, claims, figures for U.S. Appl. No. 09/632,048, Claims 1-20; filed Aug. 3, 2000.
Anthony Anthony et al., Pending specification, claims, figures for U.S. Appl. No. 09/996,355, Claims 1-73; filed Nov. 29, 2001.
William Anthony, Pending specification, claims, figures for U.S. Appl. No. 10/023,467, Claims 1-20; filed Dec. 17, 2001.
Jan. 1, 2005, Weir, et al., "DesignCon 2005, High Performance FPGA Bypass Networks".
Feb. 11, 2005, PCT International Search Report for PCT/US04/00218.
Feb. 18, 2005, PCT International Search Report for PCT/US04/14539.
Mar. 24, 2005, Australian Patent Office Examination Report for SG 200303041-8; Neifeld.
Apr. 11, 2005, PCT International Search Report for PCT/US04/18938.
Nov. 2000, Muccioli, "EMC Society Seattle and Oregon Chapters—New X2Y Filter Technology Emerges as Singles Component Solution for Noise Suppression".
Sep. 27, 2005, PCT Corrected IPER for PCT/US04/00218.
Nov. 8, 2005, Supplementary Partial European Search Report EP 99916477.
Oct. 27, 2005, Supplementary European Search Report EP 98915364.
Dec. 9, 2005, PCT ISR for PCT/US04/39777.
May 8, 2006, EP Examination Report for 99916477.5-2215.
PCT Written Opinion of the International Search Authority.
PCT International Search Report, PCT/US2007/063463.
Oct. 31, 2007, PCT International Search Report.
Oct. 31, 2007, PCT Written Opinion of the International Search.
Jun. 12, 2008, PCT International Search Report PCT/US06/06608.
Jun. 12, 2008, PCT Written Opinion of the International Search Authority PCT/US06/06608.
Jun. 12, 2008, PCT International Search Report PCT/US06/06607.
Jun. 12, 2008, PCT Written Opinion of the International Search Authority PCT/US06/06607.
Jun. 17, 2008, PCT International Search Report PCT/US06/08901.
Jun. 17, 2008, PCT Written Opinion of the International Search Authority PCT/US06/08901.

Jun. 6, 2008, European Search Report EP 07 01 9451.
Sep. 25, 2008, European Search Report EP 01 99 4116.
Sep. 25, 2008, European Search Report EP 01 99 9170.
Sep. 25, 2008, European Search Report EP 01 99 0677.
Sep. 18, 2008, PCT Written Opinion of the International Search Authority PCT/US07/063463.
Sep. 25, 2008, European Search Report EP 01 90 8876.*
Sep. 25, 2008, European Search Report EP 01 92 2559.*

Sep. 25, 2008, European Search Report EP 01 98 1731.*
Jan. 24, 1995, Patent Abstracts of Japan, English translation of abstract for JP 07-022757.*
Oct. 13, 2000, Patent Abstracts of Japan, English translation of abstract for JP 2000-28665.*

* cited by examiner

ENERGY CONDITIONER STRUCTURES

CROSS REFERENCE TO RELATED APPLICATIONS

This application is a U.S. national stage entry of international application PCT/US07/63463 filed Mar. 7, 2007, which claims priority to U.S. provisional application 60/779, 455 filed Mar. 7, 2006, entitled "ENERGY CONDITIONER STRUCTURES".

BACKGROUND OF THE INVENTION

Field of the Invention

This invention relates to energy conditioning of electrical circuits.

SUMMARY OF THE INVENTION

It is an object of the invention to provide energy conditioning to electric circuits.

The invention provides energy conditioners, and methods of making and using them. The energy conditioners each include at least one, each, of A, B, and G conductive structures. Each A, B, and G conductive structure has one or more A, B, and G layers, respectively. Each layer of the A and B structures have at least one tab. Each layer of the G conductive structure has at least 2 tabs. These two tabs (of each layer of the G conductive structure) are either on the same side of the energy conditioner as one another, or on opposite sides of the energy conditioner as one another. If the two tabs of a layer of the G conductive structure are on opposite sides of the energy conditioner as one another, then one of those two tabs of the G layer is also on the same side of the energy conditioner as a tab of an A layer, and the other of those two tabs of the G layer is on the same side as a tab of a B layer. If the two tabs of a layer of the G conductive structure are on the same side of the energy conditioner as one another, then a tab of an A layer and a tab of a B layer are both on the opposite side of the energy conditioner as the two tabs of the G layer. In either embodiment, the distance in the plane of the layers between the tab of the A layer and the tab of the B layer does not exceed the distance between the two tabs of the G layer. Preferably, the main bodies of the layers of the conductive structures are rectangular. Preferably, the A, B, and G tabs extend from relatively longer sides of the main bodies of the layers of the conductive structures.

Tab portions of each of the A, B, and G conductive structures are conductively connected to the tab portions of the layers of the same conductive structure. The conductive connections result in all layers of the A conductive structure forming a single conductive structure, and likewise for the B and G conductive structures. In the discreet component embodiments, the peripheral ends of the tabs are contacted to a conductive a material that forms part of the exterior surface of the energy conditioner. The inventors also conceive of integrated component embodiments. Integrated component embodiments include integrated circuit interposers, integrated circuit PC boards, and semiconductor integrated circuits. In the integrated embodiments. the A, B, and G layers are formed within an-structure that extends further in the plane defined by the layers to other circuitry, including other contacts for other devices as in interposers and PC boards, and also including in integrated circuits active circuitry such as diodes and transistors. In the integrated embodiments, vias containing conductive material electrically interconnect the A layers to one another, the B layers to one another, and the G layers to one another. In addition, in the integrated embodiments, the A, B, and G conductive structures connect to conductive pathways of the integrated structure at locations of the tabs shown and described herein below for the discreet embodiments. That is, tabs of the discreet embodiments are replaced in the integrated embodiments by conductive pathways leading away from the stack of the main bodies of the A, B, and G electrodes. For convenience, herein below, reference to tabs in the disclosure and clams means either tabs as shown in the figures or conductive pathways of the integrated structure at locations of the tabs shown and described herein.

Several of the figures show layers labeled as either G, A, or B. G layers refer to one or more stacked layers that form part of a G conductive structure. A refers to one or more stacked layers that for part of an A conductive structure. B refers to one or more stacked layers that form part of a B conductive structure. Layers of each structure, A, B, or G, are aligned so that side edge surfaces of tabs of layers of that structure are aligned. This alignment allows conductive material along the side edge surfaces to contact the aligned side edge surfaces of layers of each conductive structure, A, B, or G, to thereby conductively connect only those layers of each structure to one another.

Several of the figures show a stack sequence of A, B, and G layers. The inventors conceive of repeating sets of these sequences in a stack within a single device. The inventors also conceive of repeating sets of these sequences in a stack within a single device, in which one, two, or more G conductive layers on each end of the stack sandwich the interior layers of the stack. The inventors conceive of the conductive material conductively connecting to tabs of one or more of the A, B, or G layer's tabs residing only on side surfaces of the discrete embodiments, extending to top and bottom surfaces, or extending entirely around surfaces to form a closed band.

In one aspect, the invention provides energy conditioner structures, method of making and using them, wherein the structure comprises a sequence of conductive layers including a first A layer, a G layer, and a first B layer; wherein said first A layer, said G layer, and said first B layer are each conductive, and are conductively isolated from one another in said energy conditioner structure; wherein said first A layer includes a first A layer main body and a first A layer tab, said first B layer includes a first B layer main body and a first B layer tab, and said G layer includes a G layer main body and a G layer first tab; wherein said G layer is in a plane between a plane containing said first A layer and a plane containing said first B layer; where the main body of at least one of said first A layer and said first B layer opposes a portion of said G layer main body; wherein two of said first A layer tab, said first B layer tab, and said G layer first tab are on a first side of said energy conditioner, and the remaining one of said first A layer tab, said first B layer tab, and said G layer first tab is on a second side of said energy conditioner, and said second side is opposite from said first side, and using the structure comprises applying electrical energy to one of said first A layer, said G layer, and said first B layer.

DETAILED DESCRIPTION OF THE EMBODIMENTS

Figure 1A:
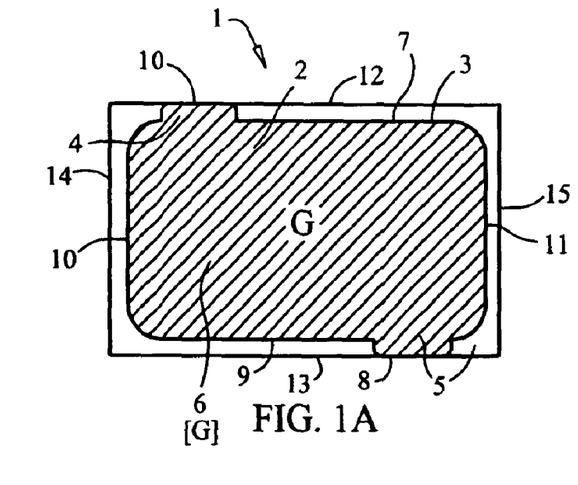
FIG. 1A is a top plan view of a sub assembly 1.

FIG. 1A shows a sub assembly 1 consisting of conductive G layer 2 on dielectric layer 3. Dielectric layers are shown herein for convenience to illustrate that main bodies of adjacent conductive layers of A, B, and G structures are not in conductive contact with layers of a different conductive structure. There may however be conductive material in vias that selectively conductively connects A layers to A layers, B layers to B layers, and G layers to G layers.

Conductive G layer 2 consists of upper tab 4, lower tab 5, and main body 6. Conductive layer upper tab 4 extends from conductive layer upper side edge surface 7 of main body 6 to conductive layer upper tab upper side edge surface 10. Conductive layer lower tab 5 extends from conductive layer lower side edge surface 9 of main body 6 to conductive layer lower tab lower side edge surface 8. Conductive G layer 2 resides on dielectric layer 3. Dielectric layer 3 extends to and is delimited by dielectric layer upper side 12, dielectric layer lower side 13, dielectric layer left side 14, and dielectric layer right side 15. Upper tab 4's upper side edge surface 10 aligns with a portion of dielectric upper side edge surface 12. Lower tab 5's lower side edge surface aligns with a portion of dielectric layer lower side edge surface 13. Conductive layer upper side edge surface 7 is recessed from dielectric layer upper side edge surface 12. Conductive layer lower side edge surface 9 is recessed from dielectric layer side edge surface 13. Conductive layer left side edge surface 10 is recessed from dielectric layer left side edge surface 14. Conductive layer right side edge surface 11 is recessed from dielectric layer right side edge surface 15. Upper tab 4 is near the left side of conductive G layer 2. Lower tab 5 is near the left side of conductive G layer 2.

In integrated embodiments, the dielectric layers extend further from the region of the main bodies of the layers of the integrated structures and the tabs need not terminate at a side edge of the dielectric layer. For example, a conductive lines extending from the locations of tabs for A, B, or G electrodes may terminate at the input of an active or passive circuit element inside the same integrated device.

Figure 1B:
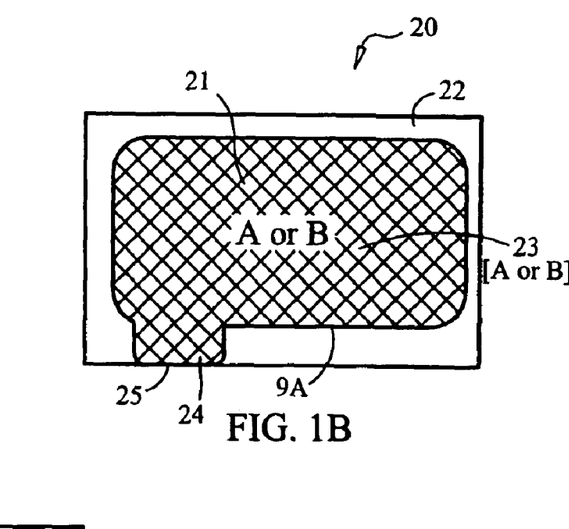
FIG. 1B is a top plan view of a sub assembly 20.

FIG. 1B shows a sub assembly 20 consisting of conductive layer 21 residing on dielectric layer 22. Conductive layer 21 represents either an A layer or a B layer. Conductive layer 21 includes main body 23 and tab 24. Conductive layer main body 23 includes upper, left, and right side edge surfaces (unnumbered), and lower side edge surface 9A, that are recessed compared to upper, lower, left, and right sides of dielectric layer 22. Tab 24 extends from the lower left side of conductive layer main body 23 to tab side edge surface 25. Conductive layer 21 has only one tab.

The dielectric layers of FIGS. 1A and 1B are of the same size and shape such that, when stacked, the side edge surfaces of the dielectric layers are aligned.

Figure 2:
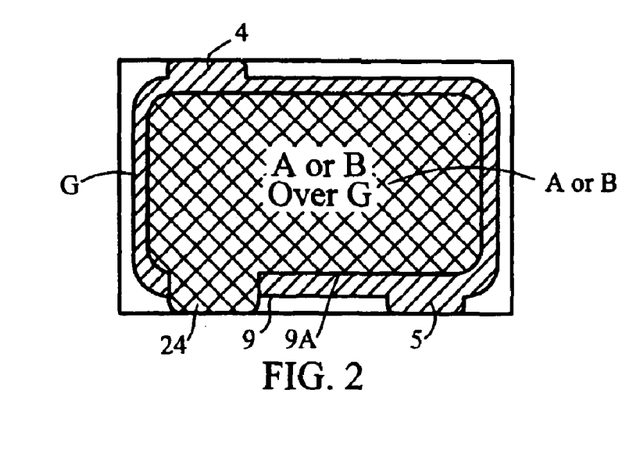
FIG. 2 is a top plan view of an assembly consisting of sub assemblies 1 and 20.

FIG. 2 is an assembly of sub assemblies 1 and 20 showing alignment of side edge surfaces of the dielectric layers, and overlap of the main bodies of the conductive layers of G and A or B. Main body 23 of the A or B conductive layer is recessed compared to larger main body 6 of the G layer. See side edge surfaces 9, 9A; the horizontal distance in the plane of the paper between them defining the length of a recess. The surface area of the major surfaces of the main bodies of any one of the A and B layers is less than the surface area of the major surfaces of the main body of the G layer. Note that conductive layer main body 23's upper, lower, left, and right sides surfaces (not numbered) are recessed compared to upper 7, lower 9, left 10, and right 11 side edge surfaces of G layer 2, respectively. Note that tab 24 is the only portion of the A or B layer that extends beyond at least one side edge surface of the G layer, in this case side edge surface 9 of G layer 6.

In less preferred embodiments, the G main body is the same size as, or smaller than, the A or B main body.

FIG. 2 also shows that the tab of the A or B layer does not overlap the tabs of the G layer, and that the tab of the A or B layer extends beyond the side edge surfaces of the G layer. FIG. 2's tab and edge alignments, tabs of different A, B, or G only overlapping with layers of the same conductive structure, and main bodies of A or B layers recessed compared to main bodies of G layers, are representative of alignments of the stacks of conductive layers of energy conditioners described herein below, unless expressly specified otherwise.

Figure 3:
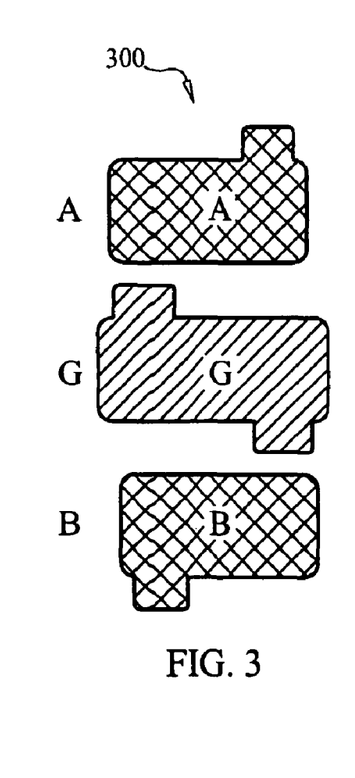
FIG. 3 is a top plan view in which sequential conductive layers of an assembly or structure have been displaced vertically in the plane of the page from one another.

FIG. 3 shows a stack of conductive layers in the sequence A, G, B of an energy conditioner embodiment 300. In embodiment 300, the G conductive layer tabs are on the upper left and lower right sides of the G conductive layer's many body. The A and B conductive layers have conductive tabs on the upper right side and lower left side of the A and B main bodies, respectively. The main bodies of the A, B, and G conductive layers are relatively extended in the left to right direction. As a result no tab of the A conductive structure overlaps with a tab of the B or G conductive structure, and no tab of the B conductive structure overlaps a tab of the G conductive structure. No tabs extend from the left or right sides. In the stack, the A and B conductive layers' main bodies are recessed compared to the G conductive layer's main body.

In alternative and less preferred embodiments, the main bodies of the A, B, and G conductive layers are relatively extended in the top to bottom of the page direction such that the tabs of the conductive layers are all on relatively short sides of the energy conditioner.

Figure 3A:
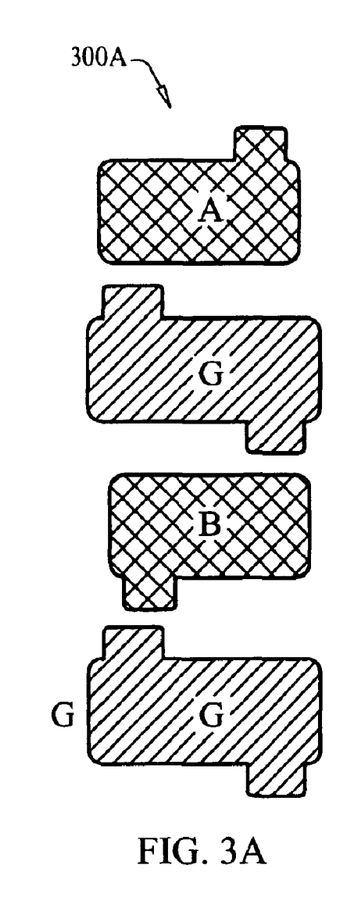
FIGS. 3A, 4A, 4B, and 5 are also top plan views in which sequential conductive layers of each assembly or structure have been displaced vertically in the plane of the page from one another.

FIG. 3A shows a stack of conductive layers in the sequence, from top to bottom of the stack, of A, G, B; G, of energy conditioner embodiment 300A. Embodiment 300A has the same stack of layers A, G, B as embodiment 300, and an additional G layer below the B layer. Both G layers have the same size, shape, and orientation in the stack. Embodiment 300A is representative of the fact that additional layers in energy conditioner embodiments, in the sequence A, G, B, G, A, G, B, etcetera, are conceived by the inventors. In addition, the inventors conceive of replacing one or more or all of the G layers, with 2, 3, or more G layers.

Figure 4A:
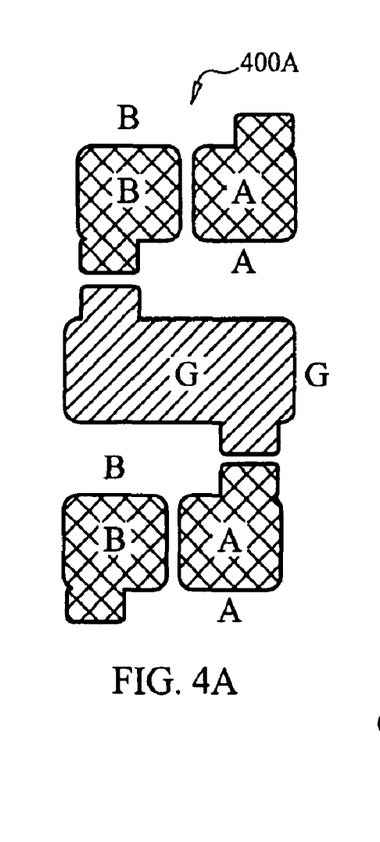

FIG. 4A shows a stack of conductive layers, having an A layer and a B layer in the same plane, for an energy conditioner embodiment 400A. The tab of the A layer in one plane is aligned with tabs of the A layers in the other planes. The tabs of the B layer in one plane is aligned with the tabs of the B layers in the other planes. Each plane containing A and B layers is separated by a G layer. The main body of each A layer overlaps the main bodies of the other A layers in the stack. The main body of each B layer overlaps the main bodies of the other B layers in the stack. No main body of any A layer overlaps the main body of any B layer in the stack. Novel features of this energy conditioner are the combination of the arrangement of the tabs, having two tabs on one side, and two tabs on the opposite side, A and B layers in the same plane, and overlap of A main bodies with only other A main bodies.

Figure 4B:
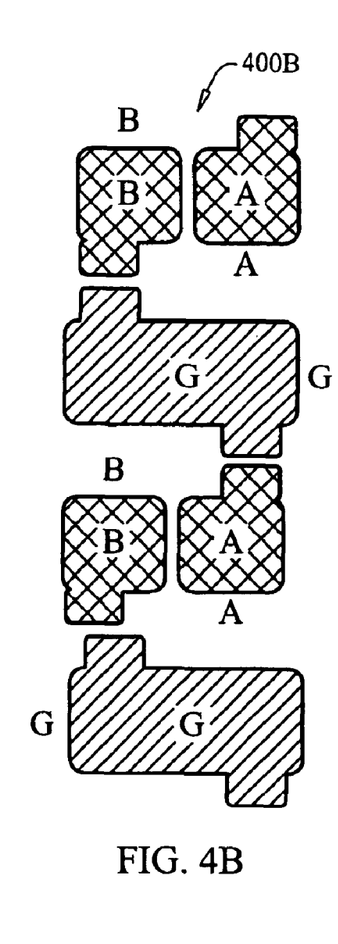

FIG. 4B shows conductive layers of energy conditioner embodiment 400B. Embodiment 400B includes the same layers as embodiment 400A and also a second G conductive layer at the bottom of the stack. FIG. 4B illustrates that, like FIG. 3A, additional layers following the sequence A, G, B, G, A, G, B, etcetera, are contemplated by the inventors.

Figure 5:
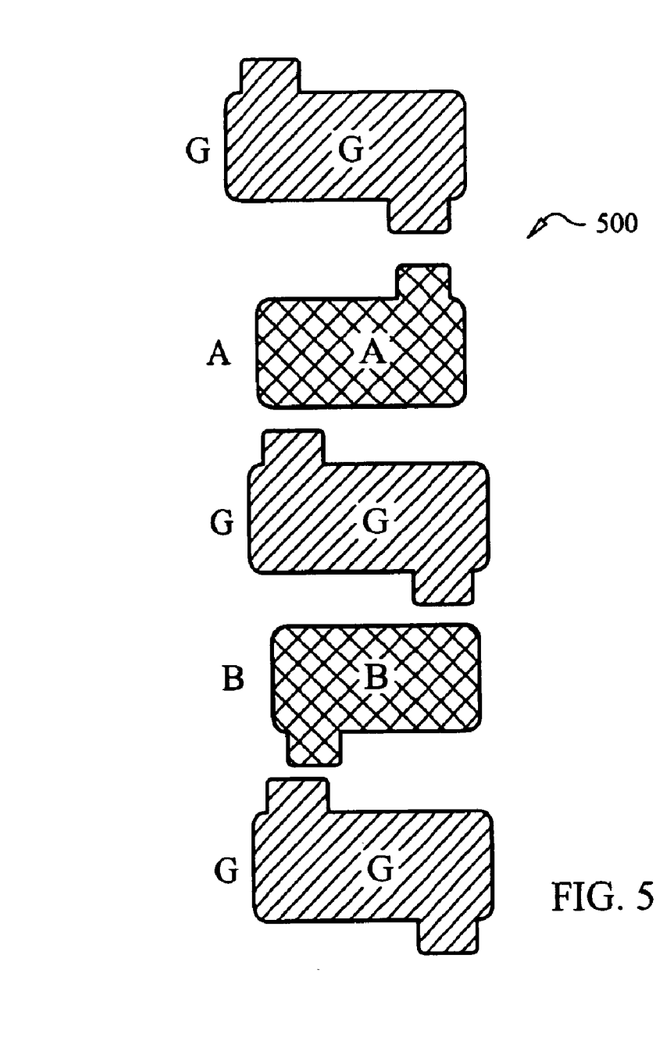

FIG. 5 shows a stack of conductive layers in the sequence G, A, G, B, G of an energy conditioner embodiment 500. Embodiment 500 has the same stack of layers A, G, B as embodiment 300, and the same stack A, G, B, G as embodiment 300A. It however shows a preferred feature, which is the existence of G layers at the top and the bottom of the stack.

Alternatively, two or more G layers may reside at the top and the bottom of the stack.

A novel feature of the energy conditioner embodiments of FIGS. 3, 3A, 4A, 4B, and 5 is the arrangement of the two G tabs, the A tab, and the B tab such that two of those tabs are on one side of the energy conditioner, the other two tabs are on the other side of the energy conditioner, and the distance between the A tab and the B tab is less than or equal to the distance between the two G tabs.

Figure 6:
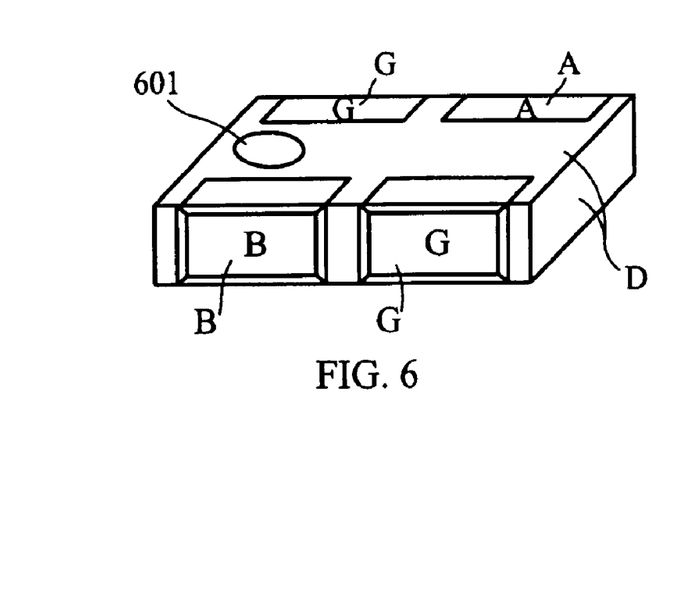
FIG. 6 is a perspective view of an exterior of an energy conditioner including any of the sequence of conductive layers shown in FIGS. 3-5.
Figure 7:
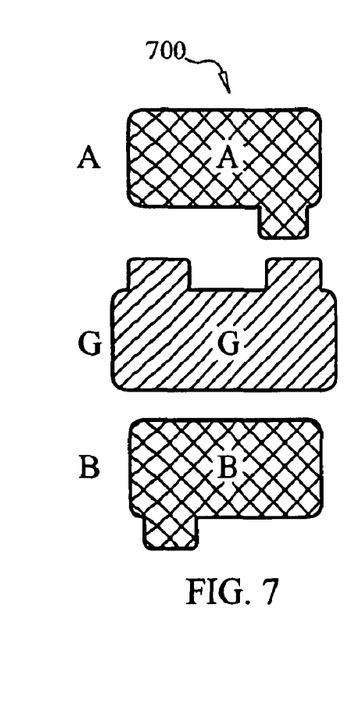
FIGS. 7, 7A, 8, and 8A are also top plan views in which sequential conductive layers of each assembly or structure have been displaced vertically in the plane of the page from one another.
Figure 7A:
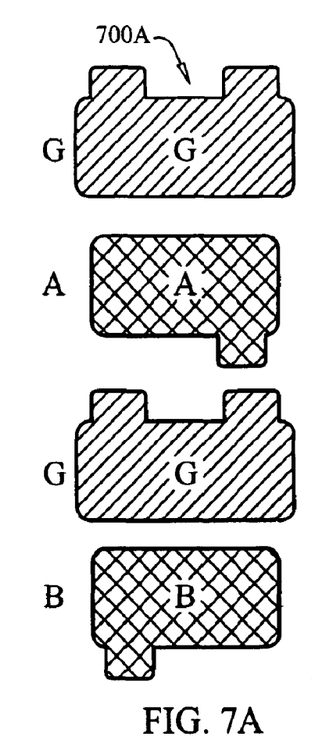
Figure 8:
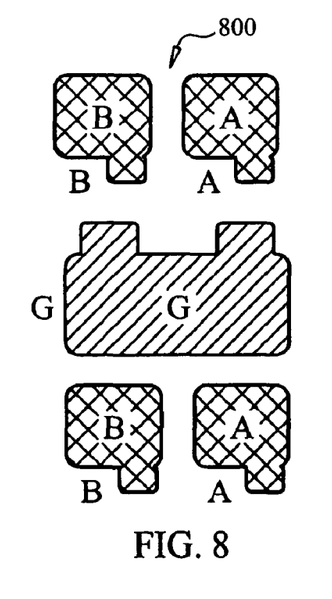
Figure 8A:
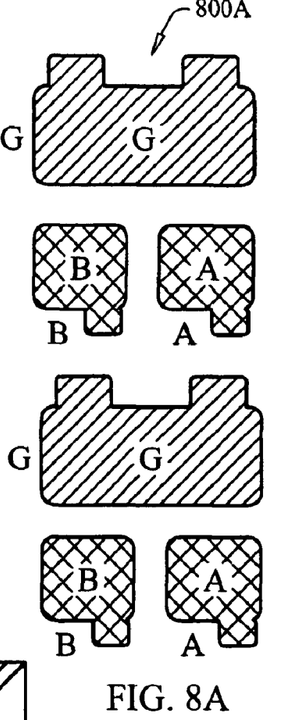

FIG. 6 shows an exterior arrangement 600 of conductive contacts to the A, B, and G structures of any of the foregoing discreet energy conditioner embodiments. In all of these embodiments, the G conductive structure has tabs leading to conductive contacts at the upper left and lower right sides of the stacks, corresponding to the G conductive contacts on the upper left and lower right sides of the exterior arrangement 600, and the energy conditioner is longer in the left to right direction in the page than in the top to bottom direction in the page. Likewise, the tabs of the A and B layers of the foregoing discreet energy conditioner embodiments result in an A conductive contact on the exterior upper right and a B conductive contact on the exterior lower left side as shown in the plane of the paper of FIG. 6. The conductive contacts are preferably formed from material applied to the exposed edges of the tabs and which material forms conductive material upon firing at sufficient temperature, as is well known in the art.

Marker 601 represents a visual marker indicating arrangement of contacts of exterior arrangement 600. Marker 601 allows a user knowledge of which contacts are A, B, and G contacts. As shown, marker 601 is between B and G contacts, indicating that the upper right side contact is an A contact. Dielectric surfaces D form portions of the exterior surface of exterior arrangement 600.

FIGS. 7, 7A, 8, 8A, 16, and 17 illustrate conductive layers of energy conditioners having tab arrangements wherein both tabs of the layers of the G conductive structure extend from one side of the stack of conductive layers, and tabs of layers of the A and B conductive structures extend from a side of the stack opposite the side having the tabs of the G layers.

Figure 9:
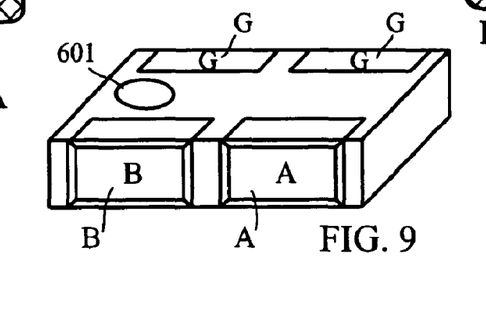
FIG. 9 is a perspective view of an exterior of an energy conditioner including any of the sequence of conductive layers shown in FIGS. 7-8.
Figure 10:
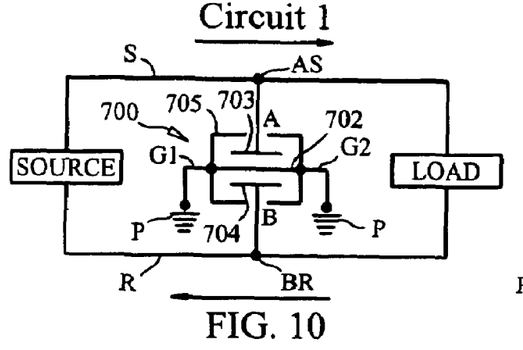
FIGS. 10-15 are schematics of circuits including energy conditioners disclosed herein.
Figure 11:
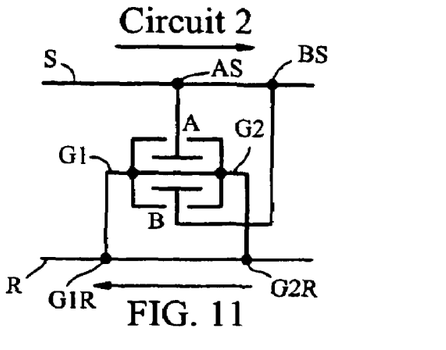
Figure 12:
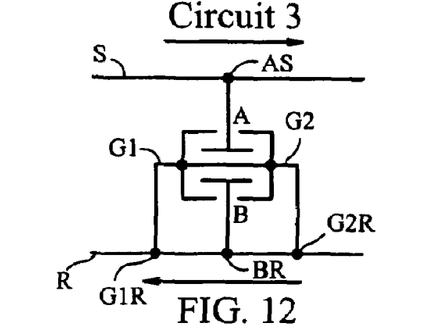
Figure 13:
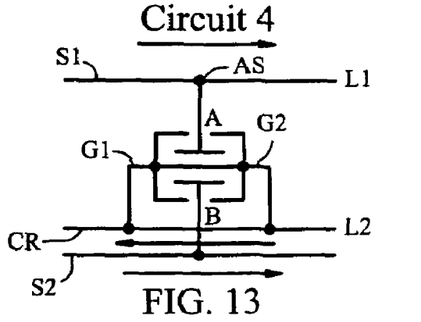
Figure 14:
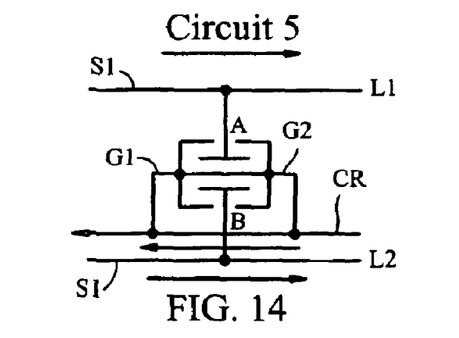
Figure 15:
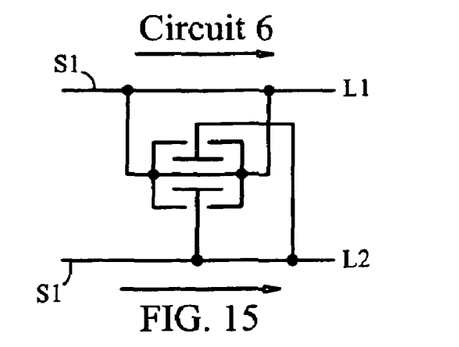

FIG. 9 shows an exterior arrangement 900 of conductive contacts to the A, B, and G structures for embodiments in which both G conductive structures are on the same side of the energy conditioner. Such as the embodiments shown in FIGS. 7, 7A, 8, 8A, 16, and 17. In this arrangement, marker 601 indicates which conductive contacts are A, B, or G. For example, with an indicia "B" and an arrow pointing toward the adjacent B contact. With respect to FIGS. 16 and 17, G and G' marker 601 may indicate by its position or indicia which is G and which is G'.

FIGS. 16-19 illustrate conductive layers of energy conditioners in which the single G layer of prior embodiments is replaced by a pair of coplanar G layers, referred to as the G and G' layers. These embodiments may include four separate conductive structures, one each associated with the A, B, G, and G' layer or layers. Alternatively, conductive structure exterior to the main bodies of the G, G', A, and B conductive layers may conductively connect the G and G' layers to one another, such as an exterior band in discrete embodiments.

Figure 16:
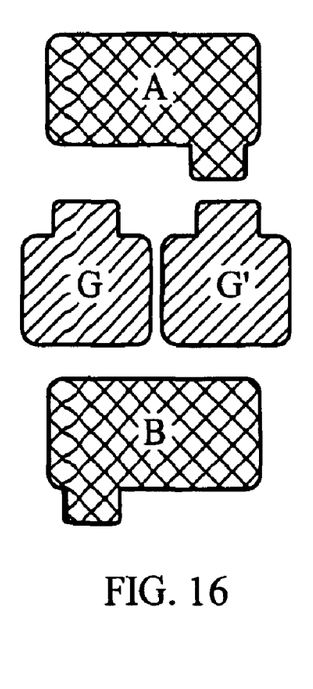
FIGS. 16-19 are also top plan views in which sequential conductive layers of each assembly or structure have been displaced vertically in the plane of the page from one another.
Figure 17:
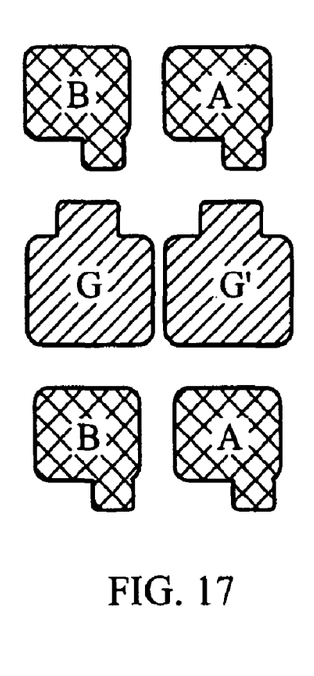
Figure 18:
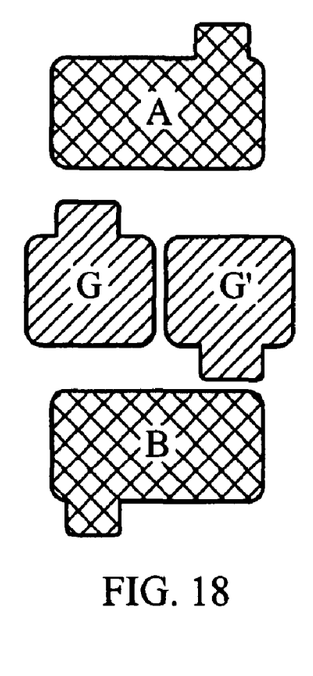
Figure 19:
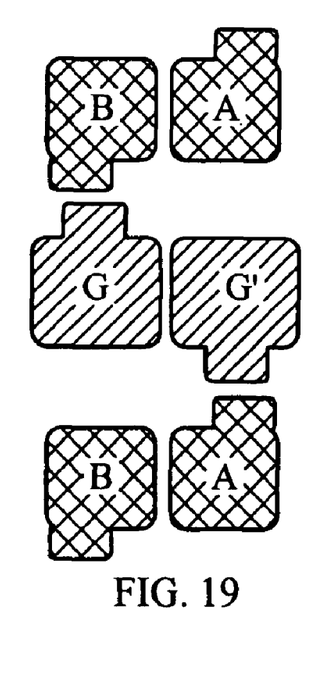

FIGS. 16 and 18 also illustrate embodiments in which there is a single A or B layer in each plane. FIGS. 17 and 19 illustrate embodiments in which there are coplanar A and B layers. FIGS. 16 and 17 illustrate embodiments in which the G and G' tabs are on one side of the energy conditioner, and the tabs for A and B electrodes are on the opposite side of the energy conditioner. FIGS. 19 and 20 illustrate embodiments in which the G or G' tabs are on the same side as the A tab, and the other of the G and G' tabs are on the same side as the B tabs, and the G and G' tabs are on opposite sides of the energy conditioner from one another.

FIGS. 10-15 show circuit diagrams for circuits including any of the foregoing energy conditioners. In FIGS. 10-15, G1 and G2 represent the two conductive contacts, to the two G conductive structures or to the G and G' conductive structures. A and B represent conductive contact to the A and B conductive structures. Source, S, SI, and S2 represent sources of electric energy. R represents a return from a load to a source. Load, L, L1, and L2 represent electric power loads. P represents a system ground. Arrows indicate conductive path directions away from higher voltage terminals of sources of power. Circuits 1-6 refer respectively to the circuits and elements shown in FIGS. 10-15 respectively.

In implementation, an energy conditioner embodiment disclosed herein is incorporated into one of circuits 1-6 shown in FIGS. 10-15, and power is applied from the source or sources to the load or loads. The energy conditioner substantially limits transmission of power in frequencies above DC in and from the circuit.

Preferably, the set back ratio of an A layer is greater than 0.5, preferably greater than 1, and more preferably greater than 5. The set back distance is defined as the distance in the plane of the layers that an edge surface of the A layer is recessed compared to the edge surface of an adjacent G layer (for example the distance between edge surfaces 9 and 9A; see FIGS. 1, 1A, and 2), divided by the minimum distance between surfaces of the adjacent A and G layers.

A preferred stacking configuration found within a single device has an even integer number of the sum of the A and B conductive layers and an odd integer number of a sum of the G conductive layer(s).

A preferred stacking configuration found within a single device has an even integer number of the sum of the A and B conductive layers and an even integer number of a sum of the G conductive layer(s).

A preferred stacking configuration found within a single device has a total sum number of all conductive layers in a stacking being an odd integer number.

A preferred stacking configuration found within a single device has a G conductive layer found to be the common center electrode layer of the entire stacking within a single device. This stacking has the sum of the A, B, and G layers found on each side of the center G conductive layer being an even integer number.

A preferred stacking configuration found within a single device has an odd integer number of A and B conductive layers and/or an even integer number of G conductive layers.

An alternate stacking configuration found within a single device has a G conductive layer found to be the common center electrode layer of the entire stacking within a single device. This stacking has the sum of the A, B, and G layers found on one side of the center G conductive layer having one additional A, B, or G layer than the other the sum of the A, B, and G layers found on the opposite side of the center G conductive layer.

A preferred stacking configuration of a single device has a rectangular shape having all outer side edges of A, B, and G conductive layer tabs found at a pair of long, opposing sides (relative to a pair of short, opposing sides of such a rectangular shaped device) of such a rectangular shaped device.

It should be noted that marker 601 represents any type of marker indicating arrangement of contacts of exterior arrangement 600. Such markers include markers that may be visible under spectrum readers that read marks outside the range of human visibility, such as infrared readers and such.

The invention claimed is:

1. An energy conditioner structure comprising:
a sequence of conductive layers including a first A layer, a G layer, and a first B layer;
wherein said first A layer, said G layer, and said first B layer are each conductive, and are conductively isolated from one another in said energy conditioner structure;
wherein said first A layer includes a first A layer main body and a first A layer tab, said first B layer includes a first B layer main body and a first B layer tab, and said G layer includes a G layer main body and a G layer first tab;
wherein said G layer is in a plane between a plane containing said first A layer and a plane containing said first B layer;
where the main body of at least one of said first A layer and said first B layer opposes a portion of said G layer main body;
wherein two of said first A layer tab, said first B layer tab, and said G layer first tab are on a first side of said energy conditioner, and the remaining one of said first A layer tab, said first B layer tab, and said G layer first tab is on a second side of said energy conditioner, and said second side is opposite from said first side;
wherein said energy conditioner structure comprises a fourth tab, and said fourth tab is either part of said G layer or said fourth tab is conductively isolated in said energy conditioner structure from said first A layer, said G layer, and said first B layer; and
wherein a distance between said first A layer tab and said first B layer tab is less than or equal to a distance between said G layer first tab and said fourth tab.

2. The structure of claim 1 wherein the main bodies of both of said first A layer and said first B layer oppose portions of said main body of said G layer, and said G layer further comprises a G layer second tab, which is said fourth tab.

3. The structure of claim 2 wherein two of said first A layer tab, said first B layer tab, said G layer first tab, and said G layer second tab are on said first side of said energy conditioner, and the other two of said first A layer tab, said first B layer tab, said G layer first tab, and said G layer second tab are on said second side of said energy conditioner, and said second side is opposite from said first side.

4. The structure of claim 3 wherein said G layer first tab and said G layer second tab are both on said first side.

5. The structure of claim 3 wherein said G layer first tab is on said first side and said G layer second tab is on said second side.

6. The structure of claim 3, wherein each of said first A layer main body, of said first B layer main body and of said G layer main body have at least one major surface;
wherein any one of said at least one major surface has a surface area; and
wherein said surface area of said at least one major surface of said G layer main body is larger than said surface area of either said at least one major surface of said first A layer main body or of said at least one major surface of said first B layer main body.

7. The structure of claim 6, wherein any one of said first A layer main body is substantially the same in size as any one of said first B layer main body.

8. The structure of claim 3, wherein said first A layer main body and said first B layer main body sandwich said G layer main body.

9. The structure of claim 8, wherein said G layer is larger than either said first A layer or said first B layer.

10. The structure of claim 8, wherein said G layer is larger than said first B layer.

11. The structure of claim 10, wherein said first A layer is substantially the same in size as said first B layer.

12. The structure of claim 3, wherein said G layer is larger than said first B layer.

13. The structure of claim 1 wherein said first A layer main body overlaps said first B layer main body.

14. The structure of claim 1 further comprising a second A layer having a second A layer main body and a second A layer tab, and a second B layer having a second B layer main body and a second B layer tab;
wherein said first A layer and said second B layer are in a same plane as one another;
wherein said first B layer and said second A layer are in a same plane as one another;
wherein said first A layer and said second A layer do not overlap with said first B layer or said second B layer;
wherein said first A layer tab and said second A layer tab are aligned with one another;
wherein said first B layer tab and said second B layer tab are aligned with one another.

15. The structure of claim 1 further comprising:
a G' layer;
wherein said G' layer is conductive and is conductively isolated in said energy conditioner from said first A layer, said first B layer, and said G layer;
wherein said G' layer comprises a G' main body portion and a G' tab portion, and said G' tab portion is said fourth tab;
wherein said G' layer is in a same plane as said G layer;
wherein said first A layer main body opposes a portion of said G layer main body;
wherein said first B layer main body opposes a portion of said G' layer main body.

16. The structure of claim 15 wherein two of said A layer tab, said B layer tab, and said G layer tab, and said G' layer tab are on said first side of said energy conditioner, and the remaining two are on said second side of said energy conditioner, and said second side is opposite from said first side.

17. The structure of claim 16 wherein said G layer tab, and said A layer tab are on said first side of said energy conditioner and said G' layer tab and said B layer tab are on said second side of said energy conditioner.

18. The structure of claim 16 wherein said G layer tab and said G' layer tab are on said first side of said energy conditioner and said A layer tab and said B layer tab are on said second side of said energy conditioner.

19. The structure of claim 15 further comprising a second A layer comprising a second A layer main body and a second A layer tab, and a second B layer comprising a second B layer main body and a second B layer tab;
- wherein said first A layer and said second B layer are in a same plane as one another;
- wherein said first B layer and said second A layer are in a same plane as one another;
- wherein said first A layer and said second A layer do not overlap with said first B layer or said second B layer;
- wherein said first A layer tab and said second A layer tab are aligned with one another;
- wherein said first B layer tab and said second B layer tab are aligned with one another.

20. The structure of claim 1 further comprising a second G layer below said first B layer.

21. The structure of claim 20 further comprising a third G layer above said first A layer.

22. The conditioner of claim 21 further comprising vias containing conductive material connecting said G layers to one another.

23. A discrete energy conditioner comprising the structure of claim 1.

24. An integrated energy conditioner comprising the structure of claim 1.

25. The structure of claim 1, wherein each of said first A layer, of said first B layer and of said G layer have at least one major surface;
- wherein any one of said at least one major surface has a surface area; and wherein said surface area of said at least one major surface of said G layer is larger than said surface area of either said at least one major surface of said first A layer or of said at least one major surface of said first B layer.

26. The structure of claim 25, wherein said first A layer is substantially the same in size as said first B layer.

27. The structure of claim 1, wherein said first A layer and said first B layer sandwich said G layer.

28. The structure of claim 27, wherein said G layer is larger than either said first A layer or said first B layer.

29. The structure of claim 27, wherein said G layer is larger than said first A layer.

30. The structure of claim 29, wherein said first A layer is substantially the same in size as said first B layer.

31. The structure of claim 1, wherein said G layer is larger than said first A layer.

* * * * *

UNITED STATES PATENT AND TRADEMARK OFFICE
Certificate

Patent No. 8,026,777 B2                                Patented: September 27, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David J. Anthony, Erie, PA (US); Anthony A. Anthony, Erie, PA (US); and William M. Anthony, Erie, PA (US)

Signed and Sealed this Twenty-ninth Day of May 2012.

ROBERT J. PASCAL
*Supervisory Patent Examiner*
Art Unit 2817
Technology Center 2800